(12) United States Patent
Roberts et al.

(10) Patent No.: US 10,281,655 B2
(45) Date of Patent: May 7, 2019

(54) FIELD INVERSION WAVEGUIDE USING MICRO-PRISM ARRAY

(71) Applicant: Qioptiq Limited, St. Asaph, Denbighshire (GB)

(72) Inventors: John Roberts, Mold (GB); James Babington, Prestatyn (GB)

(73) Assignee: Qioptiq Limited, St. Asaph (GB)

( * ) Notice: Subject to any disclaimer, the term of this patent is extended or adjusted under 35 U.S.C. 154(b) by 113 days.

(21) Appl. No.: 14/925,276

(22) Filed: Oct. 28, 2015

(65) Prior Publication Data

US 2016/0124154 A1 May 5, 2016

(30) Foreign Application Priority Data

Oct. 29, 2014 (GB) .................................. 1419233.0

(51) Int. Cl.
| | | |
|---|---|---|
| *G02B 6/34* | (2006.01) | |
| *G02B 27/00* | (2006.01) | |
| *F21V 8/00* | (2006.01) | |
| *G02B 27/01* | (2006.01) | |
| *G02B 6/02* | (2006.01) | |

(52) U.S. Cl.
CPC ............. *G02B 6/34* (2013.01); *G02B 6/0008* (2013.01); *G02B 6/02052* (2013.01); *G02B 27/0081* (2013.01); *G02B 27/0172* (2013.01)

(58) Field of Classification Search
CPC .... G02B 6/34; G02B 6/0008; G02B 6/02052; G02B 27/0081
USPC ............ 359/201.1, 201.2, 207.8, 211.3, 628, 359/638–640, 622; 353/33, 81
See application file for complete search history.

(56) References Cited

U.S. PATENT DOCUMENTS

| | | | | |
|---|---|---|---|---|
| 3,387,530 A | * | 6/1968 | Helmut ..................... | G01J 1/40 396/281 |
| 5,627,923 A | * | 5/1997 | Kakizaki ................ | G02B 6/423 385/14 |
| 5,978,607 A | * | 11/1999 | Teremy .................. | G02B 23/14 348/E5.047 |
| 6,067,195 A | | 5/2000 | Hirunuma et al. | |

(Continued)

FOREIGN PATENT DOCUMENTS

| | | |
|---|---|---|
| CN | 102162737 A | 8/2011 |
| WO | 2014168387 A1 | 10/2014 |

OTHER PUBLICATIONS

STIC Search Report dated Sep. 11, 2017.*

(Continued)

*Primary Examiner* — Stephone B Allen
*Assistant Examiner* — Travis S Fissel
(74) *Attorney, Agent, or Firm* — Peter A. Nieves; Sheehan Phinney Bass & Green PA

(57) ABSTRACT

A field inverting optical waveguide is disclosed. The waveguide is configured to convey electromagnetic radiation from an ingress end to an egress end along an optical path. The waveguide includes an optically flat input surface disposed at the waveguide ingress end, and an exit surface disposed substantially opposite the input surface at the waveguide egress end. The exit surface includes an array of prisms projecting outward from or inward to the exit surface. The input surface and the exit surface are arranged substantially orthogonally to the optical path.

18 Claims, 6 Drawing Sheets

(56) References Cited

U.S. PATENT DOCUMENTS

| | | | |
|---|---|---|---|
| 7,710,512 B2* | 5/2010 | Lee | G02F 1/133606 349/62 |
| 2005/0135741 A1 | 6/2005 | Lim et al. | |
| 2005/0248961 A1* | 11/2005 | Kazuhiro | G02B 6/0038 362/633 |
| 2005/0259440 A1* | 11/2005 | Onishi | G02B 6/0036 362/613 |
| 2006/0024044 A1* | 2/2006 | Takato | G02B 25/001 396/386 |
| 2006/0059950 A1* | 3/2006 | Buellesfeld | C03B 23/043 65/85 |
| 2006/0072203 A1* | 4/2006 | Lee | G02B 6/0053 359/625 |
| 2006/0153518 A1 | 7/2006 | Abu-Ageel | |
| 2007/0279721 A1* | 12/2007 | Shechlerman | G02B 26/124 359/211.1 |
| 2008/0123109 A1* | 5/2008 | Iwasaki | G01B 11/25 356/610 |
| 2009/0128918 A1 | 5/2009 | Abu-Ageel | |

OTHER PUBLICATIONS

European Search Report for EP15 192 066.7, dated Apr. 11, 2016.
GB Search Report for Patent Application No. GB1419233.0. dated Apr. 24, 2015, 3 pages.

* cited by examiner

FIELD INVERSION WAVEGUIDE USING MICRO-PRISM ARRAY

CROSS-REFERENCE TO RELATED APPLICATIONS

This application claims priority to GB Patent Application serial number 1419233.0, filed Oct. 29, 2014, which is incorporated by reference herein in its entirety.

FIELD OF THE INVENTION

The present invention relates to optics, and more particularly, is related to field inverting waveguides.

BACKGROUND OF THE INVENTION

Known optical devices utilize diffraction gratings or beam splitters to couple collimated light out of a waveguide and into the eye of a user. The basic physics of these structures result in light being inefficiently coupled out of the waveguide from the consideration of the eyebox geometry. The beam splitters (essentially using reflection of the internal waveguide rays to out couple them) or diffraction gratings (using the corresponding phase of the internal waveguide plane waves to obtain transmitted/reflected diffraction orders) share the property that the out coupled collimated light is diverging with respect to the eyebox.

In standard waveguide helmet mounted display (HMD) technologies one of two ways of filling the eyebox is generally utilized. First, the original pupil may be largely oversized so that the eyebox can be filled with a small fraction of the image (and the rest lost). This results in relatively large collimators and waveguide substrates. A second way to fill the eyebox is to use a pupil replication technique, where an initial small pupil is input into the waveguide. As the pupil propagates down the waveguide it interacts with intermediate structures such as diffraction gratings or beam splitters that produce one or more copies of the original pupil travelling in a different direction to the original pupil. Pupil replication may be used to create a large pupil in both fields of view. The subsequent penalties resulting from pupil replication include a non-uniformity across the field and a banding of the replicated pupils as a function of the field. These limitations are inherent in pupil replicating designs. Therefore, there is a need to overcome one or more of the abovementioned shortcomings.

SUMMARY OF THE INVENTION

Embodiments of the present invention provide a field inversion waveguide using a micro-prism array. Briefly described, in architecture, the waveguide is configured to convey electromagnetic radiation from an ingress end to an egress end along an optical path. The waveguide includes an optically flat input surface disposed at the waveguide ingress end, and an exit surface disposed substantially opposite the input surface at the waveguide egress end. The exit surface includes an array of prisms projecting outward from or inward to the exit surface. The input surface and the exit surface are arranged substantially orthogonally to the optical path.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

DETAILED DESCRIPTION

Figure 1:
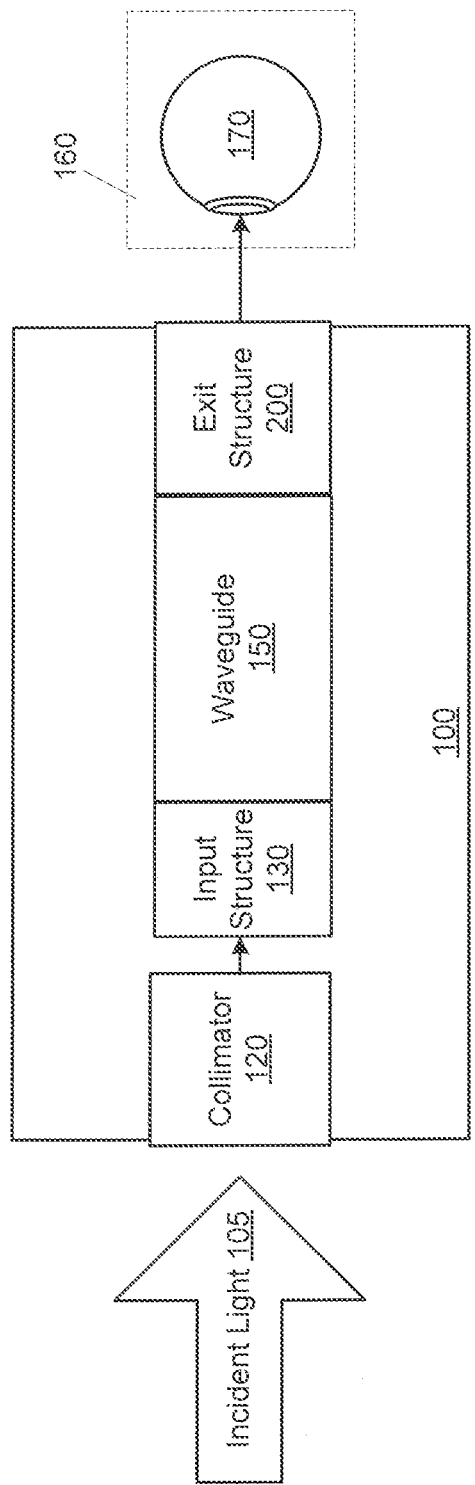
FIG. 1 is a schematic diagram showing an optical device under the first and/or second embodiments.

The following definitions are useful for interpreting terms applied to features of the embodiments disclosed herein, and are meant only to define elements within the disclosure.

As used within this disclosure, "substantially" means "very nearly," for example, "substantially uniform" means uniform within normal manufacturing tolerances as would be expected by persons having ordinary skill in the art.

As used within this disclosure, the "eyebox" of an optical device is defined as the amount of allowable error in the eye relief position of a user that provides a clear target image and full field of view (FoV). The eyebox defines a range of motion for the eye of a user that provides an optimum target image and full FoV despite the eye being slightly in front of, or slightly behind the optimum eye relief position.

As used within this disclosure, "optically flat" refers to a surface that deviates by no more than one quarter of a wavelength from a perfect plane.

Reference will now be made in detail to embodiments of the present invention, examples of which are illustrated in the accompanying drawings. Wherever possible, the same reference numbers are used in the drawings and the description to refer to the same or like parts.

Embodiments of the present invention include an array of micro prisms as an exit structure for an HMD waveguide, for example, a 4×4 array, among other configurations. The prisms may take the form of tilted roof prisms that implement two reflections and a refraction to invert the field of view of collimated light exiting a waveguide. The embodiments serve to reflect the light into the intended eyebox in a highly efficient way, providing a simple structure for a full color functioning display, and allowing control of both uniformity and pupil banding that commonly affect replicating waveguides. In addition, embodiments that perform one field inversion are also presented to further improve on existing replicating waveguide structures.

The first and second embodiments employ a waveguide, for example, an HMD waveguide, including a two-dimensional array of micro prisms as a principal exit structure. A micro prism is an optical imaging prism with spatial dimensions in the sub-millimeter regime. Under the first embodiment, the individual prisms each have the geometry of a tilted roof prism. In the ray optical picture for light propagating in the waveguide, the prisms frustrate the total internal reflection (TIR) within the waveguide. This is done in a very specific manner, implementing two reflections and a refraction of the light rays. For example, rays within the waveguide enter the individual micro prisms of the array through the bottom prism face. The rays then reflect off the two roof prism faces, one after the other. Finally, the rays are refracted out of the prisms from the prism face opposite the roof edge. This serves to invert the field of view (FoV) of collimated light exiting a waveguide. Fortuitously, this optical structure enables one to redirect the light into the intended eyebox of the user. In this way the system becomes highly efficient. Additionally, this embodiment provides a simple optical structure for a full color functioning system, and allows control of both uniformity and pupil banding that commonly affect pupil replicating waveguides. A second embodiment that performs one field inversion is also implemented to further improve on existing replicating waveguide structures, described later herein.

As noted above, previous solutions utilize diffraction gratings or beam splitters to couple collimated light out of a waveguide. These are naturally divergent structures with respect to how light is exiting the waveguide and propagating to the eyebox. By performing field inversion as with the present embodiments, the waveguide becomes extremely efficient while keeping the input pupil size small with respect to a standard replicating waveguide. The embodiments may also address larger fields of view and color systems.

The first and second embodiments each include a waveguide exit structure having an optical substrate patterned with a two-dimensional array of micro prisms. Under the first embodiment, the prisms project externally from the substrate. Under the second embodiment, the prisms project internally, forming indentations in the substrate.

In order to display a useful image to the observer, under the first embodiment and the second embodiment, an appropriate image source (incorporating any required drive electronics) and a collimating lens provide the image content. The image source may be transmissive, reflective or self-emissive. For indicative purposes only the image source could take the form of, but is not limited to, a Liquid Crystal Display (LCD), Active Matrix Thin Film Transistor (AM-TFT), Liquid Crystal on Silicon (LCoS), Digital Mirror Device (DMD), Cathode Ray Tube (CRT) or Organic Light Emitting Diode (OLED).

As shown in FIG. 1, in an optical device 100 under the first and second embodiments, collimator 120 receives incident light 105. The collimator 120 serves to map the spatial extent of an image (display) source into an appropriate angular range. As a non-limiting example, a 30°×20° field of view from the collimator may be considered representative. The light 105 emitted by the image source is converted into a collimated beam (parallel rays at some angle relative to an optical axis of the optical device 100), by the collimator 120, ensuring that the virtual image, as viewed by an observer, appears to originate from an infinite distance. The input structure 130 couples a collimated beam into an optical substrate, such that the collimated beam then propagates along the waveguide 150 by total internal reflection. The optical substrate allows propagation of light by total internal reflection. The optical substrate may be considered to be a waveguide, not to be confused with the larger optical device 100 (input structure, substrate & output structure), which may also be referred to as a waveguide.

The input structure 130 may be, for example, a prism face or an embedded mirror. It is desirable that each pupil is coupled into the waveguide 150 by the collimator 120 in a one-to-one fashion. An exit structure 200 frustrates the TIR and removes a portion of the light out of the substrate and into the eye 170 of an observer. Provided this condition is simultaneously met for all field angles, a complete virtual image appearing to be located at infinity is generated at the eyebox 160.

As described above, standard waveguide HMD technologies generally fill the eyebox 160 by use of an oversized pupil, or by pupil replication. The first and second embodiments instead provide a field inversion technique that increases the overall efficiency of the waveguide structure 150 by ensuring that the eyebox 160 is filled with light from the appropriate region of the exit structure 200. To accomplish this, embodiments of the detailed prism arrays described in detail below employ re-direction of the propagating waves from the waveguide 150. In this manner the current embodiments do not suffer from uniformity or banding issues, and outside world transmission through the waveguide 150 is solely dictated by the relative intermediate flat area to prism area.

Figure 2:
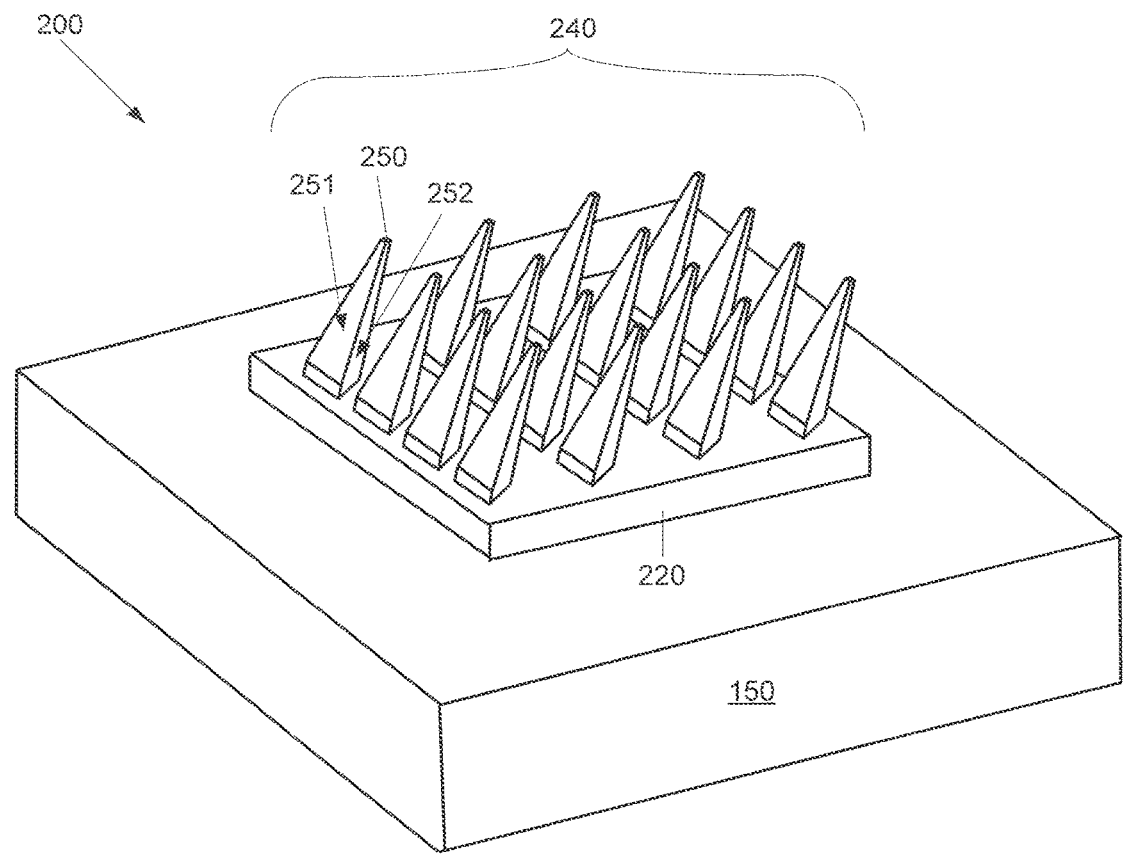
FIG. 2 is a schematic diagram of a portion of a waveguide exit structure having an array of projecting prisms under the first embodiment from a front perspective view.

Under the first embodiment, shown by FIG. 2, an array 240 of prisms 250 projects outward from a substrate 220 into a medium surrounding the waveguide 150 (FIG. 1), for example, air. This is referred to as a Projected Tilted Prism Array (PTPA). This substrate 220 is for fabrication purposes and is generally not fundamental to the design and mode of operation. The thickness of the substrate 220 depends upon fabrication, mechanical and environmental considerations.

FIG. 2 shows a detail of the basic form of the exit structure 200. The PTPA forms a sub area of one side of the waveguide substrate 150 exit surfaces 200. The PTPA covers an area appropriate to the desired FoV, exit pupil and eye relief and may be determined by first order optical principles (and is design specific). Typically the PTPA covers a significant fraction of the one substrate 220 face. A small boundary region surrounding the optically functional area of the PTPA may also be desired in order to mitigate against mechanical damage or misalignment. The opposite side, the input structure 130 (FIG. 1) is typically optically flat. The optical substrate 220 may be optical glass, plastic or any medium which is transparent to the wavelength of the radiation to be propagated. The two faces confining the radiation by TIR are parallel such that the substrate notionally has a rectangular cross section. In practice, it may be desirable to profile the edges of the substrate 220. The thickness of the substrate 220 is a design parameter and may be chosen almost arbitrarily, however, in the embodiment shown this is around 5 mm.

Figure 3:
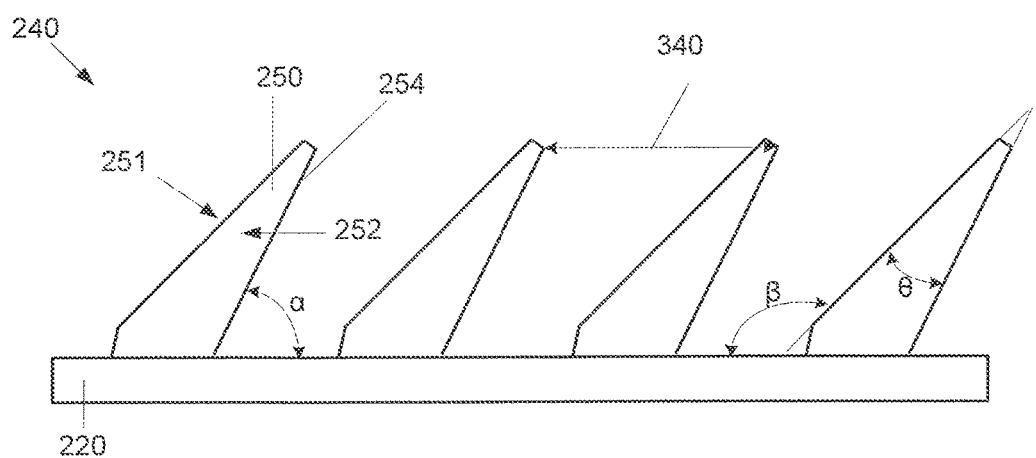
FIG. 3 is a schematic diagram of a portion of a waveguide exit structure having an array of projecting prisms under the first embodiment from a side view.
Figure 4:
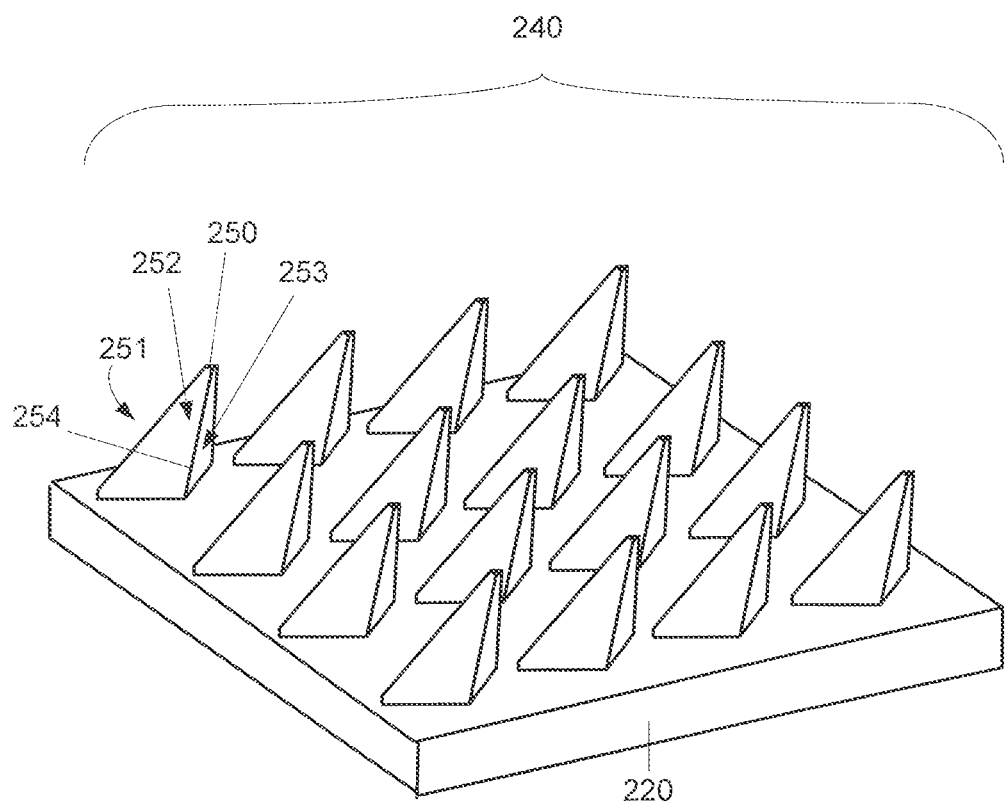
FIG. 4 is a schematic diagram of a portion of a waveguide exit structure having an array of projecting prisms under the first embodiment from a rear perspective view.
Figure 5:
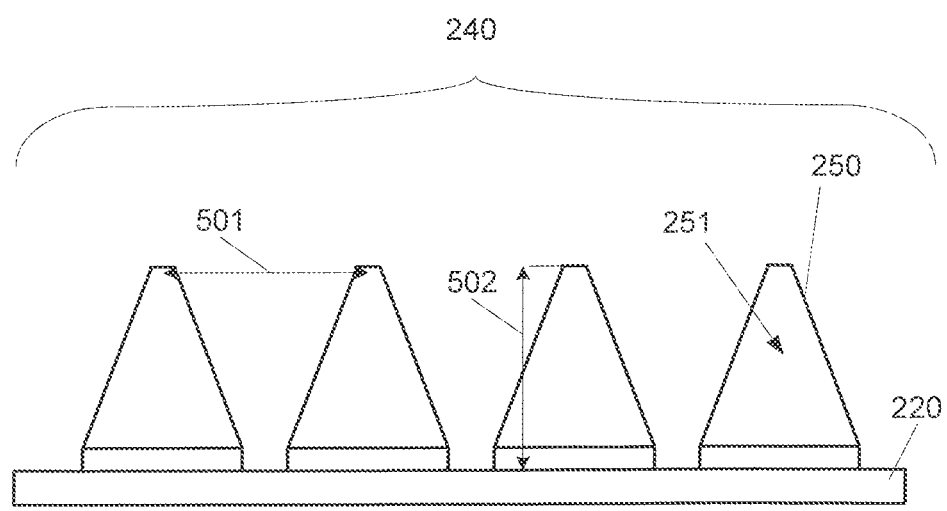
FIG. 5 is a schematic diagram of a portion of a waveguide exit structure having an array of projecting prisms under the first embodiment from a front view.

The side geometry of the prism array 240 is presented in FIG. 3. The prism array 240 typically includes a plurality of prisms 250 arranged two dimensionally in M rows and N columns. The array lattice need not necessarily be rectangular, nor regular and remains a design parameter. A first angle α between a rear corner edge 254 and the substrate 220 is typically an acute angle, for example, between 45 and 90 degrees, to preserve the TIR of incident light rays from the waveguide substrate 220. Angles closer to 90 degrees may result in greater difficulty satisfying the TIR condition. Alternatively, if surfaces 252 and 253 are mirror coated, the angle can be more freely chosen. A second angle β measured between the prism front surface 251 and the waveguide substrate 220 is typically obtuse, for example, between 110 and 150 degrees, and serves to change a nominal axis of the exiting light rays. These triangle angles α, β are relevant for the field inversion of a first section of the field of view, since effectively the pupil in the plane of the waveguide substrate 220 in FIG. 3 is determined only by the angles shown therein. In FIG. 4 the back faces 252, 256 of the prisms are shown. The two rear faces 252, 253 are nominally at 90° to one another and together with angle α from FIG. 3 constitute a tilted roof prism configuration. The two rear faces 252, 253 are responsible for inverting the field of view in a second section, where the second section includes the remaining field of view not included in the first section. In FIG. 5 the front surfaces 251 of the PTPA prisms 250 are shown, from which the light rays are refracted out of the waveguide 150 and into the eye 160 (FIG. 1) of a user. The front surfaces 251 of the prisms 250 may be substantially planar, and configured in a generally isosceles triangular shape. As shown in FIGS. 2-5, the top portion of the front face 251 triangle may be somewhat truncated. This is because in the first section of the field of view the light propagates up the roof prism edge but is designed to stop before it reaches the point vertex that would otherwise be there. For example, once a FoV is defined, the prisms may include additional clearance for manufacturing and system purposes.

FIG. 3 shows a distance 340 and an angle θ between the prism 250 front surface 251 and back corner 254. Similarly, FIG. 5 shows a prism spacing 501 and prism height 502. The distance 340, together with the angle θ, define an intermediate distance between the back surface 254 of one prism and the continuation of the front surface 251 of the next prism. This distance, for example, on the order of 0.5 mm, together with the distance 501 in FIG. 5 (also of the order of 0.5 mm) determines the relative area of the base of the prism to the unit cell area of the underlying lattice. This in turn defines how efficient the PTPA structure is, and at the same time, how much outside world light is let through the intermediate flat areas contained in the unit cell. The one is inversely related to the other and is design specific, but typically >50% of outside world light is desirable.

In contrast with the projecting prisms of the first embodiment, the second embodiment includes a waveguide 150 (FIG. 1) with an exit structure 200 (FIG. 1) including an array of indented prisms which may be used to perform a similar role to the prisms of the first embodiment, described above.

Figure 6A:
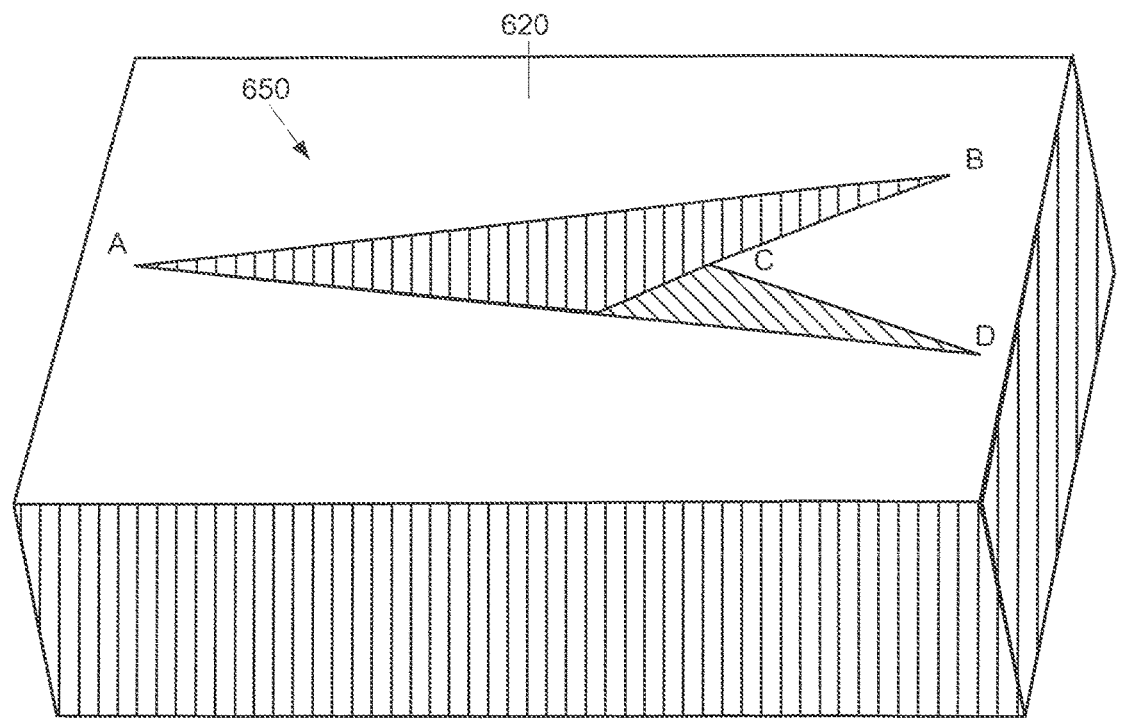
FIG. 6A is a schematic diagram of a detail of a waveguide exit structure having an array of indented prisms under the second embodiment from a front perspective view.
Figure 6B:
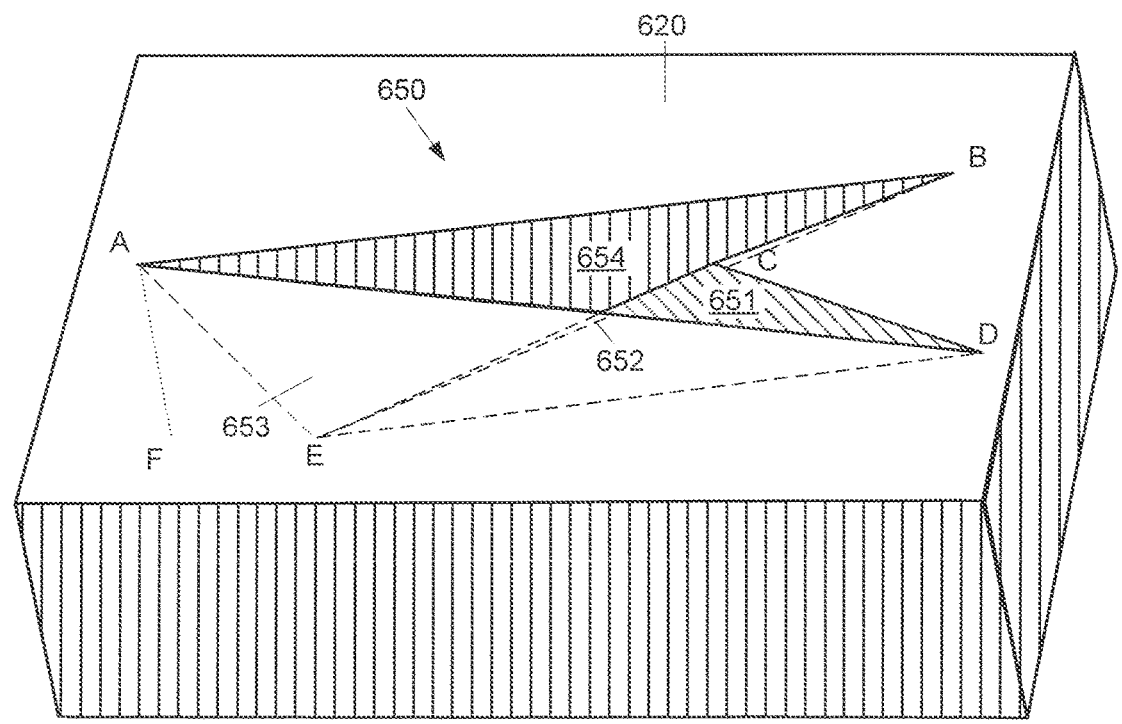
FIG. 6B is a schematic diagram of a detail of a waveguide exit structure having an array of indented prisms under the second embodiment from a front perspective view, including subsurface features.

FIG. 6A shows a sectional view of an exemplary indented prism 650 as viewed by an observer looking at the indented surface of a waveguide exit structure substrate 620. FIG. 6B shows the same view as FIG. 6A, with the addition of dashed lines to indicate features hidden from view by the surface of the substrate 620, where 620 is analogous to the exit structure 200 (FIG. 1) of the waveguide 150 (FIG. 1).

Figure 6C:
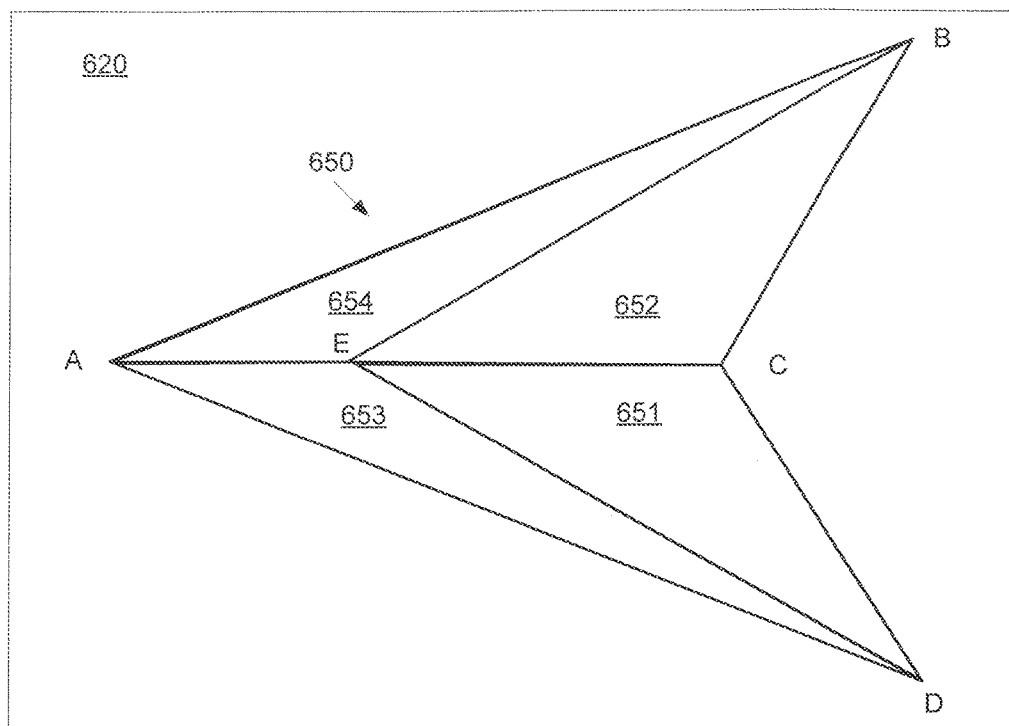
FIG. 6C is a schematic diagram of a detail of a waveguide exit structure having an array of indented prisms under the second embodiment from a top view.
Figures 6D, 6E:
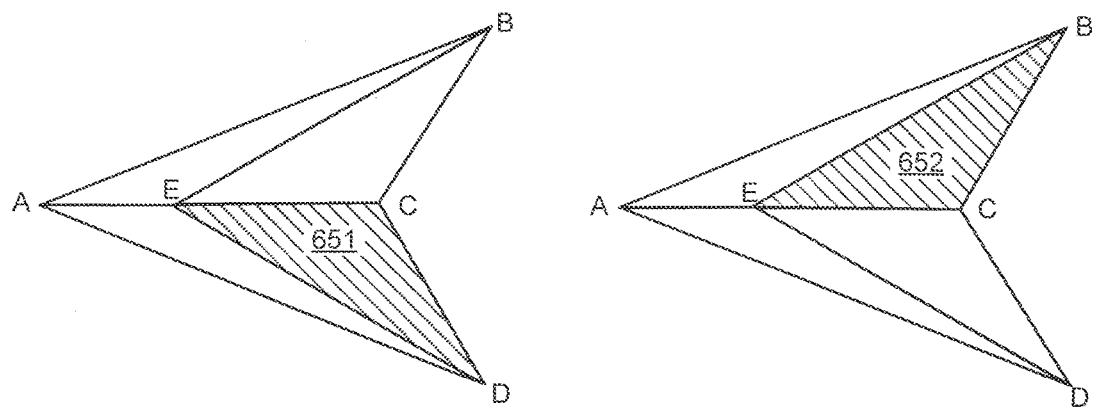
FIG. 6D is a schematic diagram of a detail of a waveguide exit structure having an array of indented prisms under the second embodiment from a top view highlighting a first prism surface.
FIG. 6E is a schematic diagram of a detail of a waveguide exit structure having an array of indented prisms under the second embodiment from a top view highlighting a second prism surface.

The indented prism 650 may be defined by five points, including four coplanar points [ABCD] on the surface of the substrate 620, and a vertex point [E] located below the substrate surface 620. The plane [ABCD] represents the surface of the substrate 620, while the vertex point [E] represents the maximum indentation depth of the prism 650 from the substrate surface 620. This maximum depth is also illustrated by the point [F], depicted directly below point [A] from the perspective of the substrate surface 620. FIG. 6A shows the indentation as it would appear viewed from an arbitrary angle, while FIG. 6B shows details of the indentation vertex [E]. FIGS. 6C-6E show the indented prism 650 from an overhead perspective.

A first reflective surface 651 is a planar surface defined by the points [CDE], formed at a first angle with respect to the substrate surface 620. A second reflective surface 652 is a planar surface defined by the points [BCE], formed at a second angle with respect to the substrate surface 620. The first angle and the second angle may be substantially the same angle. The two reflective surfaces 651 and 652 are optically functional and as such have low RMS surface roughness (of the order of 5 nm). Since these two surfaces 651, 652 are not operating by total internal reflection, they may have standard mirror coatings as per determined by the substrate material. The angle between the first reflective surface 651 and the second reflective surface 652 is nominally 90°, and should be accurately controlled. A first rear surface 653 defined by the points [ADE] and a second rear surface 654 defined by the points [ABE] may not be optically functional, and therefore the surfaces may be made to less stringent tolerances than the reflective surfaces 651, 652, for example, regarding surface roughness and/or flatness in comparison with the two reflective surfaces 651, 652. The length of a single indented micro prism may be generally be in the sub millimeter range, for example, on the order of 0.5 mm. An angle [<ACE] (in the region of 20°) formed between the intersection [CE] of the two reflective surfaces 651, 652 and the substrate plane 620 is a design parameter which may depend on a refractive index of the substrate 620 and the desired input/output angles of the incident light. Both optical plastics and glasses are possible as choices of substrate material, and may be chosen mostly for field of view considerations. The indented prism design is mostly unchanged due to this.

In alternative embodiments, the positions of vertices [A], [B], [D] and [E] may be design parameters which depend on the angles the non-optically functional faces 653, 654 of the prism 650 make with the substrate plane 620. These angles define the draft angle of the prism 650, defined as the angle [<EAF] between line [AE] and the normal [AF] to the substrate plane [ABCD], and may be adjusted as desired.

A plurality of indented prisms 650 may be configured as an array formed within a substrate surface 620 of a waveguide 150 (FIG. 1). The array structure arrangement shares exactly the same requirements as the first embodiment.

Preferably, first and second embodiments may be incorporated into systems 100 small enough to be worn on the head as an HMD. The choice of substrate 220 materials and the size and area density of the micro prism array 240 may be arranged such that the assembly is partially transmissive to the outside world and can be tuned to a user requirement. This enables the observer to view the surroundings together with an infinity focused Augmented Reality (AR) display incorporating useful data overlaid on top of the output image.

The first embodiment facilitates full inversion of the FoV (horizontal and vertical); however fabrication of the prism structures may be complex. The second embodiment facilitates inversion of the FoV in one sense (horizontal or vertical, but not both), but prism fabrication using current manufacturing techniques may be more readily implemented.

Figure 7:
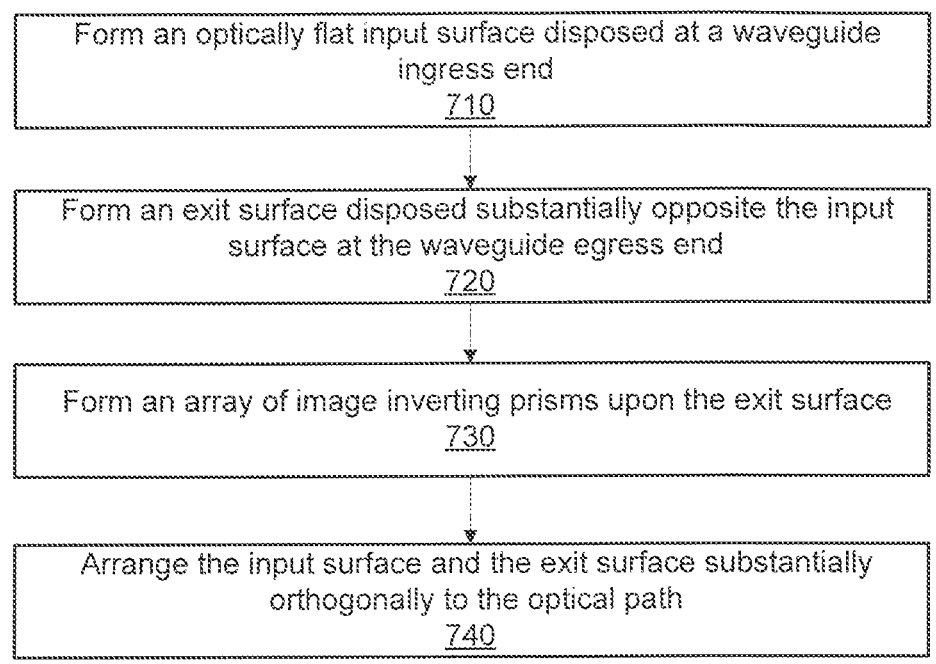
FIG. 7 is a flowchart of an exemplary method for forming an optical device according to the first and second embodiments.
Figure 7:

FIG. 7 is a flowchart of an exemplary method 700 for forming an optical device according to the first and second embodiments described previously. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

An optically flat input surface 130 (FIG. 1) disposed at a waveguide 150 (FIG. 1) ingress end is formed, as shown by block 710. An exit surface 200 (FIG. 1) disposed substantially opposite the input surface 130 (FIG. 1) is formed at the waveguide 150 (FIG. 1) egress end, as shown by block 720. An array of field inverting prisms 250 (FIG. 2)/650 (FIG. 6A) is formed upon the exit surface 200 (FIG. 1), as shown by block 730. The input surface 130 (FIG. 1) and the exit surface 200 (FIG. 1) are arranged substantially orthogonally to the optical path, as shown by block 740. The waveguide may be manufactured in modular fashion; the collimator and waveguide structure may be fabricated using standard optical glass shop processes. This holds true also for the input structure. The output structure may be more challenging to fabricate, however current micro-fabrication processes such as wet/dry etching or embossing may be employed.

In summary, the use of a two-dimensional prismatic array structure to optically implement two reflections to invert the field of view is a central feature of the present invention. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A field inverting optical waveguide configured to convey electromagnetic radiation from a waveguide ingress end to a waveguide egress end along an optical path, comprising:
   an optically flat input surface disposed at the waveguide ingress end; and
   an exit surface disposed substantially opposite the input surface at the waveguide egress end, the exit surface further comprising:
      an array of prisms projecting outward from the exit surface away from the input surface,
      wherein the input surface and the exit surface are arranged substantially orthogonally to the optical path and the array of prisms is configured to invert at least a portion of a field of view of incident light entering the waveguide, and the optical path is substantially parallel to an optical axis of the waveguide, and wherein the array of prisms further comprises an array comprising a plurality of tilted roof prisms, wherein each tilted roof prism comprises a front surface oriented at an obtuse angle with respect to the exit surface wherein the obtuse angle excludes a body of the tilted roof prism, a roof adjoining the front surface comprising a first inverting rear surface and a second inverting rear surface meeting at a rear surface joining angle of nominally 90 degrees at a corner edge, and the corner edge is tilted at an acute angle with respect to the exit surface, wherein the acute angle excludes the body of the tilted roof prism.

2. The waveguide of claim 1, wherein the array of prisms is configured to optically implement at least two reflections to invert at least a portion of a field of view of incident light entering the waveguide.

3. The waveguide of claim 1, wherein each prism of the array of prisms further comprises a substantially triangular egress surface.

4. The waveguide of claim 1, wherein each prism of the array of prisms further comprises a plurality of substantially triangular ingress surfaces.

5. A field inverting optical waveguide configured to convey electromagnetic radiation from a waveguide ingress end to a waveguide egress end along an optical path, comprising:
   an optically flat input surface disposed at the waveguide ingress end; and
   an exit surface disposed substantially opposite the input surface disposed at the waveguide egress end, further comprising an array of prisms indented into the waveguide at the exit surface toward the input surface,
   wherein the input surface and the exit surface are arranged substantially orthogonally to the optical path, and the array of prisms is configured to invert at least a portion of a field of view of incident light entering the waveguide, and wherein the array of prisms further comprises an array comprising a plurality of tilted roof prisms, wherein each tilted roof prism comprises a front surface oriented at an obtuse angle with respect to the exit surface wherein the obtuse angle excludes a body of the tilted roof prism, a roof adjoining the front surface comprising a first inverting rear surface and a second inverting rear surface meeting at a rear surface joining angle of nominally 90 degrees at a corner edge, and the corner edge is tilted at an acute angle with respect to the exit surface, wherein the acute angle excludes the body of the tilted roof prism.

6. The waveguide of claim 5, wherein each prism of the array of prisms indented into the waveguide at the exit surface further comprises:
   a substantially planar first surface comprising a first edge and a second edge; and
   a substantially planar second surface comprising a first edge and a second edge,
   wherein the first surface first edge is adjacent to the second surface first edge, the first surface second edge is adjacent to the exit surface, and the second surface second edge is adjacent to the exit surface.

7. The waveguide of claim 5, wherein the array of prisms is configured to optically implement at least one reflection to invert at least a portion of a field of view of incident light entering the waveguide.

8. The waveguide of claim 6, wherein an angle between the first surface and the second surface is substantially a right angle.

9. The waveguide of claim 6, wherein the first surface and the second surface are substantially triangular in shape.

10. The waveguide of claim 6, wherein the first surface and the second surface are configured to be optically functional.

11. The waveguide of claim 10, the first surface and the second surface comprise low RMS surface roughness in the range of 0-10 nm.

12. An optical system comprising:
a collimator configured to receive incident radiation; and
an image inverting waveguide configured to receive radiation from the collimator and convey the radiation to an egress end along an optical path, comprising:
an optically flat input structure configured to receive radiation from the collimator; and
an exit structure disposed substantially opposite the input structure, further comprising an array of prisms configured to convey radiation comprising an image from the waveguide to an eyebox of a viewer and to invert the entire image, and wherein the array of prisms further comprises an array comprising a plurality of tilted roof prisms, wherein each tilted roof prism comprises a front surface oriented at an obtuse angle with respect to the exit surface wherein the obtuse angle excludes a body of the tilted roof prism, a roof adjoining the front surface comprising a first inverting rear surface and a second inverting rear surface meeting at a rear surface joining angle of nominally 90 degrees at a corner edge, and the corner edge is tilted at an acute angle with respect to the exit surface wherein the acute angle excludes the body of the tilted roof prism.

13. The optical system of claim 12, further comprising an array of prisms projecting outward from the exit structure relative to the input structure.

14. The optical system of claim 12, further comprising an array of prisms indented into the waveguide at the exit surface toward the input surface.

15. A method for forming an image inverting optical waveguide configured to convey electromagnetic radiation received at a waveguide ingress end to a waveguide egress end along an optical path, comprising the steps of:
forming an optically flat input surface disposed at the waveguide ingress end;
forming an exit surface disposed substantially opposite the input surface at the waveguide egress end; and
forming an array of field inverting prisms upon the exit surface,
wherein the input surface and the exit surface are arranged substantially orthogonally to the optical path,
and wherein the array of prisms further comprises an array comprising a plurality of tilted roof prisms, wherein each tilted roof prism comprises a front surface oriented at an obtuse angle with respect to the exit surface wherein the obtuse angle excludes a body of the tilted roof prism, a roof adjoining the front surface comprising a first inverting rear surface and a second inverting rear surface meeting at a rear surface joining angle of nominally 90 degrees at a corner edge, and the corner edge is tilted at an acute angle with respect to the exit surface, wherein the acute angle excludes the body of the tilted roof prism.

16. The method of claim 15, wherein the array of prisms projects outward from the exit surface away from the input surface.

17. The method of claim 15, wherein the array of prisms is inset from the exit surface toward the input surface.

18. An optical waveguide configured to convey electromagnetic radiation from a waveguide ingress end to a waveguide egress end along an optical path, comprising:
an optically flat input surface disposed at the waveguide ingress end; and
an exit surface disposed substantially opposite the input surface at the waveguide egress end, the exit surface further comprising:
an array of micro prisms projecting outward from the exit surface away from the input surface,
wherein the input surface and the exit surface are arranged substantially orthogonally to the optical path and the array of prisms is configured to invert an image of incident light entering the waveguide, each micro prism of the array of micro prisms has a sub-millimeter length, and the optical path is substantially parallel to an optical axis of the waveguide, and wherein the array of prism further comprises an array comprising a plurality of tilted roof prisms, wherein each tilted roof prism comprises a front surface oriented at an obtuse angle with respect to the exit surface wherein the obtuse angle excludes a body of the tilted roof prism, a roof adjoining the front surface comprising a first inverting rear surface and a second inverting rear surface meeting at a rear surface joining angle of nominally 90 degrees at a corner edge, and the corner edge is tilted at an acute angle with respect to the exit surface, where the acute angle excludes the body of the tilted rood prism.

* * * * *